(12) United States Patent
Govea et al.

(10) Patent No.: US 11,477,060 B2
(45) Date of Patent: Oct. 18, 2022

(54) SYSTEMS AND METHODS FOR MODULATION CLASSIFICATION OF BASEBAND SIGNALS USING ATTENTION-BASED LEARNED FILTERS

(71) Applicant: Motorola Solutions, Inc., Chicago, IL (US)

(72) Inventors: Stephen J. Govea, Schaumburg, IL (US); Rodger W. Caruthers, Des Plaines, IL (US); Nathanael P. Kuehner, Rolling Meadows, IL (US)

(73) Assignee: Motorola Solutions, Inc., Chicago, IL (US)

( * ) Notice: Subject to any disclaimer, the term of this patent is extended or adjusted under 35 U.S.C. 154(b) by 855 days.

(21) Appl. No.: 16/385,611

(22) Filed: Apr. 16, 2019

(65) Prior Publication Data

US 2020/0336344 A1 Oct. 22, 2020

(51) Int. Cl.
*H04L 27/00* (2006.01)
*G06N 3/04* (2006.01)
*G06N 3/08* (2006.01)
*H04L 25/03* (2006.01)

(52) U.S. Cl.
CPC .......... *H04L 27/0012* (2013.01); *G06N 3/04* (2013.01); *G06N 3/08* (2013.01); *H04L 25/03165* (2013.01)

(58) Field of Classification Search
None
See application file for complete search history.

(56) References Cited

U.S. PATENT DOCUMENTS

| | | | |
|---|---|---|---|
| 8,964,904 B2 * | 2/2015 | Ciacci | H04L 25/03 375/322 |
| 9,768,988 B1 * | 9/2017 | Pokharel | H04L 25/03968 |
| 2003/0169829 A1 * | 9/2003 | Vella-Coleiro | H04L 25/03834 375/296 |

(Continued)

OTHER PUBLICATIONS

Timothy O'Shea et al. "An Introduction to Deep Learning for the Physical Layer." IEEE Transactions on Cognitive Communications and Networking, vol. 3, No. 4, Dec. 2017, pp. 563-575., doi:10.1109/tccn.2017.2758370.

(Continued)

*Primary Examiner* — Otis L Thompson, Jr.
(74) *Attorney, Agent, or Firm* — Baker Botts L.L.P.; Michael A. Sartori

(57) ABSTRACT

Systems and methods for classifying baseband signals include receiving, at a pre-processing stage of a neural network whose objective is modulation classification performance, a complex quadrature vector of interest including a plurality of samples of a baseband signal derived from a radio frequency signal of an unknown modulation type, providing the vector of interest to a plurality of FIR filters, each of which outputs a respective intermediate filtered version of the vector of interest, combining the outputs of two or more of the FIR filters to produce a filtered version of the vector of interest, including applying respective weightings to the outputs of the FIR filters, and providing the filtered version of the vector of interest to an analysis stage of the neural network for classification with respect to a plurality of known modulation types. The neural network may apply attention-based selection to learn the filters and respective weightings.

20 Claims, 6 Drawing Sheets

(56) References Cited

U.S. PATENT DOCUMENTS

| | | | |
|---|---|---|---|
| 2011/0218950 A1* | 9/2011 | Mirowski | A61B 5/7267 |
| | | | 706/58 |
| 2014/0062745 A1* | 3/2014 | Kinyua | H03M 1/661 |
| | | | 341/144 |
| 2020/0327397 A1* | 10/2020 | Govea | H04L 27/22 |
| 2022/0174676 A1* | 6/2022 | Huang | H04W 4/80 |

OTHER PUBLICATIONS

Timothy J. O'Shea et al. "Convolutional Radio Modulation Recognition Networks." In Proc. Int. Conf. Eng. Appl. Neural Netw., Aberdeen, U.K., 2016, pp. 213-226, Jun. 10, 2016.

Timothy J. O'Shea et al. "Semi-Supervised Radio Signal Identification." 2017 19th International Conference on Advanced Communication Technology (ICACT), Feb. 2017, pp. 33-38, doi:10.23919/icact.2017.7890052.

Nathan West et al. "Deep Architectures for Modulation Recognition." 2017 IEEE International Symposium on Dynamic Spectrum Access Networks (DySPAN), Mar. 6, 2017, 13 Pages, doi:10.1109/dyspan.2017.7920754.

Timothy James O'Shea et al. "Over-the-Air Deep Learning Based Radio Signal Classification." IEEE Journal of Selected Topics in Signal Processing, vol. 12, No. 1, Feb. 2018, pp. 168-179., doi:10.1109/jstsp.2018.2797022.

\* cited by examiner

SYSTEMS AND METHODS FOR MODULATION CLASSIFICATION OF BASEBAND SIGNALS USING ATTENTION-BASED LEARNED FILTERS

BACKGROUND OF THE INVENTION

Radio Frequency (RF) communication systems pervade the modem world, connecting an ever-growing array of devices and services for a variety of consumer, industrial, and defense applications. RF signal quality degrades in real-world communication channels through a variety of effects, such as multipath effects, co-channel interference, fading, transmission distance, and environmental noise. Traditionally, radio signal classification has relied on hand-crafted, expert features and a priori knowledge about the types of radio hardware and modulations expected in a given environment. The proliferation of legacy and new RF communication standards, along with the adoption of frequency and modulation-agile Software Defined Radio (SDR) technology, allows communications systems to support a broad frequency range and modulation library, even on commodity level hardware. The resulting complexity in the electromagnetic spectrum makes labor intensive analysis systems unsustainable.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
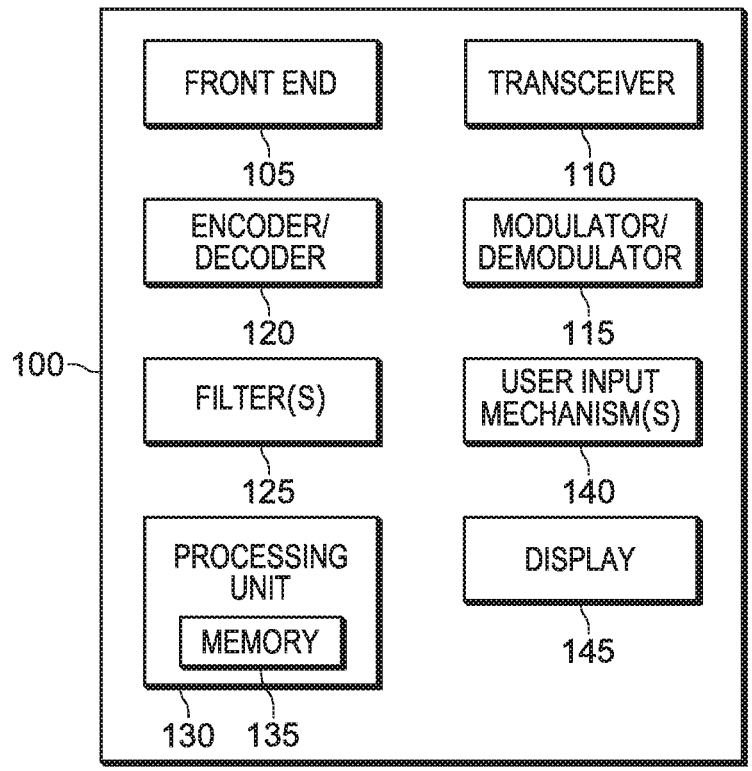
FIG. 1 is a block diagram illustrating selected elements of a system for classifying baseband signals derived from radio frequency signals with respect to modulation type, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and methods for classifying baseband signals derived from radio frequency signals with respect to modulation type. In one embodiment, a disclosed method includes receiving, at a pre-processing stage of a neural network whose objective is modulation classification performance, a complex quadrature vector of interest including a plurality of samples of a baseband signal derived from a radio frequency signal of an unknown modulation type. Each sample includes real and imaginary parts of the baseband signal of the unknown modulation type in the complex plane. The method also includes providing the complex quadrature vector of interest to a first plurality of finite impulse response (FIR) filters, each of which transforms the complex quadrature vector of interest input into an output comprising a respective different intermediate filtered version of the complex quadrature vector of interest and combining the outputs of two or more of the FIR filters to produce a filtered version of the complex quadrature vector of interest. The combining includes applying respective weightings to the outputs of the FIR filters. The method also includes providing the filtered version of the complex quadrature vector of interest to an analysis stage of the neural network for classification with respect to a plurality of known modulation types, receiving an indication of modulation classification performance of the neural network, and modifying a filter coefficient or the respective weighting applied to the output of at least one FIR filter in the first plurality of FIR filters dependent on the indication of modulation classification performance.

In one embodiment, a disclosed system for classifying baseband signals derived from radio frequency signals with respect to modulation type includes an analysis stage of a neural network whose objective is modulation classification performance, a first plurality of finite impulse response (FIR) filters, and a pre-processing stage of the neural network. The pre-processing stage is configured to receive a complex quadrature vector of interest including a plurality of samples of a baseband signal derived from a radio frequency signal of an unknown modulation type. Each sample includes real and imaginary parts of the baseband signal of the unknown modulation type in the complex plane. The pre-processing stage is also configured to provide the complex quadrature vector of interest to the first plurality of FIR filters, each of which transforms the complex quadrature vector of interest input into an output comprising a respective different intermediate filtered version of the complex quadrature vector of interest, and to combine the outputs of two or more of the FIR filters to produce a filtered version of the complex quadrature vector of interest. The combining includes applying respective weightings to the outputs of the FIR filters. The pre-processing stage is also configured to provide the filtered version of the complex quadrature vector of interest to the analysis stage of the neural network for classification with respect to a plurality of known modulation types, to receive an indication of modulation classification performance of the neural network, and to modify a filter coefficient or the respective weighting applied to the output of at least one FIR filter in the first plurality of FIR filters dependent on the indication of modulation classification performance.

It at least some embodiments, prior to receiving the complex quadrature vector of interest, the neural network may be trained to classify baseband signals derived from radio frequency signals with respect to the plurality of known modulation types.

In at least some embodiments, the training may include receiving a plurality of complex quadrature training vectors. Each training vector may include a plurality of samples of a baseband signal derived from a radio frequency signal of a respective one of the plurality of known modulation types. For each of the plurality of complex quadrature training vectors, the training may include providing the complex quadrature training vector to the first plurality of FIR filters, providing the complex quadrature training vector to a filter selection sub-network of the neural network, the output of which includes a filter selection vector in which each element represents a weighting to be applied to the output of a respective one of the first plurality of FIR filters, combining the outputs of the first plurality of FIR filters to produce a filtered version of the complex quadrature training vector, the combining including applying the respective weightings to the outputs of the first plurality of FIR filters, providing the filtered version of the complex quadrature training vector to the analysis stage of the neural network, receiving, as an output of the neural network, a classification result for the complex quadrature training vector with respect to the plurality of known modulation types, and comparing the classification result with the known modulation type of the baseband signals derived from the radio frequency signal for which a plurality of samples is included in the complex quadrature training vector.

In some embodiments, the neural network may be trained to select the first plurality of FIR filters from among a second plurality of FIR filters, the second plurality of FIR filters including the first plurality of FIR filters and one or more additional FIR filters, and the selecting including determining respective filter coefficients for each of the first plurality of FIR filters.

In some embodiments, the neural network may be trained to determine respective filter coefficients for each of the first plurality of FIR filters, the determining including applying a Lasso (L1) regularization penalty to bias the respective FIR filter coefficients for each of the first plurality of FIR filters toward zero.

In some embodiments, the neural network may be trained to determine respective filter coefficients for each of the first plurality of FIR filters, the determining including applying an FIR bandwidth penalty to the objective function of the neural network to bias the respective FIR filter coefficients for each of the first plurality of FIR filters toward coefficients consistent with minimal bandwidth filter designs.

In some embodiments, the neural network may apply an attention-based selection mechanism to select the two or more FIR filters from among the first plurality of FIR filters.

In some embodiments, the neural network may apply an attention-based selection mechanism to determine the respective weightings represented in the filter selection vector.

In some embodiments, for a given one of the first plurality of FIR filters, the respective weighting is zero, and the two or more FIR filters do not include the given FIR filter. In some embodiments, the respective filter coefficients for each of the first plurality of FIR filters may be predefined. In some embodiments, the number of FIR filters in the first plurality of FIR filters may be predefined.

The systems and methods described herein for modulation classification of baseband signals derived from radio frequency signals may include a learned, attention-based FIR filter data transform in a pre-processing stage for a deep learning model. The model may be trained end-to-end using an objective function that influences FIR filter design.

An FIR filter is digital filter commonly in use in a variety of application contexts. For an L order FIR filter, the output sequence is a weighted sum of the most recent input values as shown in equation (1) below. In this equation, the $b_i$ terms represent filter coefficients.

$$y[n] = \sum_{i=1}^{L} b_i \cdot x[n-1] \qquad \text{Equation (1)}$$

Systems and methods that incorporate learned FIR filters in a pre-processing stage that feeds a deep learning model for modulation detection and classification have been shown, through simulation and experimentation, to achieve increased modulation classification performance over modulation classification systems that include only a deep learning model. In some embodiments, by leveraging RF domain-specific signal processing expertise in the objective function as it relates to FIR filter designs together with a data-driven deep learning model, the systems described herein may achieve a 14% reduction in relative error rate over a deep-learning-only approach to modulation classification.

FIG. 1 is a block diagram illustrating selected elements of a system 100 for classifying baseband signals derived from radio frequency signals with respect to modulation type, in accordance with some embodiments. The illustrated components of FIG. 1, along with other various modules and components, may be coupled to each other by or through one or more control or data buses that enable communication between them. The use of control and data buses for the interconnection between and exchange of information among the various modules and components would be apparent to a person skilled in the art in view of the description provided herein. In various embodiments, system 100 may be, or be a component of, a base station, a mobile station, or another device configured to receive and, in some cases, transmit baseband signals derived from radio frequency signals, or radio frequency signals from which baseband signals are derived, and to classify baseband signals with respect to modulation type. In some embodiments, system 100 may be integrated with an electronic communications device, for example, a portable radio, a cellular telephone, a tablet computer, and the like.

In the illustrated embodiment, system 100 includes a front end 105, a transceiver 110, an encoder/decoder 120, a modulator/demodulator 115, one or more filters 125, which may include one or more FIR filters, a modulation classification processing unit 130, which includes memory 135, one or more user input mechanisms 140, and a display 145. In other embodiments, system 100 may include more, fewer, or different elements than those illustrated in FIG. 1.

The front end 105 may include various digital and analog components, which for brevity are not described herein and which may be implemented in hardware, software, or a combination of both, including one or more radio frequency filters, signal splitters, signal switches, signal combiners, transmit power amplifiers, and the like (not shown). The front end 105 may include one or more wired or wireless input/output (I/O) interfaces configurable to communicate with base stations, mobile stations, or other devices configured to receive and, in some cases, transmit baseband signals derived from radio frequency signals or radio frequency signals from which baseband signals are derived. In at least some embodiments, the front end 105 may receive radio frequency signals from an antenna communicatively coupled to the front end 105 (not shown), optionally filter the signals using one or more radio frequency filters, and pass them to the transceiver 110. Likewise, the front end 105 may receive radio frequency signals from the transceiver 110, optionally filter the signals using one or more radio frequency filters, and transmit them via the antenna.

In various embodiments, transceiver 110 may be or include a wireless transceiver such as a DMR transceiver, a P25 transceiver, a Bluetooth transceiver, a Wi-Fi transceiver perhaps operating in accordance with an IEEE 802.11 standard, such as 802.11a, 802.11b, or 802.11g, a WiMAX transceiver perhaps operating in accordance with an IEEE 802.16 standard, an LTE transceiver, or another similar type of wireless transceiver configurable to communicate via a wireless radio network. In some embodiments, transceiver 110 may be or include one or more wireline transceivers 110, such as an Ethernet transceiver, a Universal Serial Bus (USB) transceiver, or similar transceiver configurable to communicate via a twisted pair wire, a coaxial cable, a fiber-optic link or a similar physical connection to a wireline network. In various embodiments, transceiver 110 may be or include a software defined transceiver implemented using a frequency and modulation-agile Software Defined Radio (SDR) technology. The transceiver 110 may be coupled to combined modulator/demodulator 115, which is coupled to encoder/decoder 120.

In the illustrated embodiment, the transceiver 110 receives modulated radio frequency signals, e.g., a carrier frequency signal modulated with a baseband signal, from an antenna via the front end 105. The radio frequency signals may be modulated using any of a variety of modulation types and formats, in different embodiments and at different times. Modulator/demodulator 115 extracts and demodulates the in-phase and quadrature baseband signals from the received modulated radiofrequency signal. The transceiver 110 may communicate the demodulated baseband signals to encoder/decoder 120, which decodes the signals to extract data encoded in the signals. Modulator/demodulator 115 may receive a baseband signal encoded with data by encoder/decoder 120 and modulate the baseband signal with a carrier signal to produce a modulated radio frequency signal. The transceiver 110 transmits the modulated radio frequency signal via the front end 105 and the antenna.

The modulation classification processing unit 130 may include a microprocessor configured to execute program instructions that implement a neural network, including pre-processing and analysis stages, trained for classifying baseband signals derived from radio frequency signals with respect to modulation type. Other program instructions, when executed by the microprocessor, may perform training the neural network for classifying baseband signals derived from radio frequency signals with respect to modulation type. In some embodiments, the modulation classification processing unit 130 may include a graphics processing unit (GPU) configured to perform certain aspects of a method for classifying baseband signals derived from radio frequency signals with respect to modulation type or a method for training a neural network to perform such classifications. In various embodiments, memory 135 may include a Read Only Memory (ROM) and a Random Access Memory (RAM) for storing, at various times, program instructions and data for performing some or all of the modulation classification and neural network training steps set forth in FIGS. 5 and 6 and the accompanying text. In some embodiments, memory 135 may also store program instructions and data for initializing system components, encoding and decoding voice, data, control, or other signals that may be transmitted or received between system 100 and one or more base stations or mobile stations (not shown). In some embodiments, some or all of the functionality of encoder/decoder 120 or of other elements of system 100 shown in FIG. 1 may be implemented by program instructions executed by the microprocessor of classification processing unit 130 or another processing unit (not shown).

User input mechanisms 140 may include any of a variety of suitable mechanisms for receiving user input, such as for initializing and initiating a modulation classification exercise or for initializing and initiating an exercise to train a neural network for modulation classification, as described herein. Display 145 may include any suitable display technology for presenting information to a user including, for example, a modulation classification result. Each of the user input mechanisms 140 and display 145 may be communicatively coupled to the modulation classification processing unit 130.

In at least some embodiments, one or more filters 125 may be configured to pre-process baseband signals, or representations thereof, prior to providing them to modulation classification processing unit 130 for modulation classification. For example, in some embodiments, filters 125 may be or include an FIR filter transform module, such as FIR filter transform module 204 illustrated in FIG. 2 and described below. In some embodiments, some or all of the functionality of FIR filter transform module 204 shown in FIG. 2 may be implemented by program instructions executed by a microprocessor or GPU of classification processing unit 130 or another processing unit (not shown).

A variety of defense and commercial applications rely on fast and accurate signal classification. As noted above, the proliferation of legacy and new RF communication standards, along with the adoption of SDR technology, has led to increased complexity in the electromagnetic spectrum making labor intensive analysis systems unsustainable. The systems and methods described herein, which incorporate FIR filters at pre-processing stage to a deep learning model for modulation detection and classification may, in various embodiments, be used to detect and classify RF signals of interest using limited input data, Artificial Intelligence (AI), and Machine Learning (ML), enabling performance improvements over expert feature analysis methods and methods that rely solely on a deep learning model without such FIR filtering.

More specifically, the systems and methods described herein may incorporate multiple FIR filters at a pre-processing stage for which the filter parameters, including filter coefficients and weightings, are determined using a neural network with end-to-end training based on modulation classification as the objective function. In some embodiments, the neural network may use attention-selection of the learned filters to weight contributions of each of the filters acting on a single input to generate a single output. In some embodiments, the neural network may be trained for attention-selection of predefined FIR filters, where the selection weights are trained but the filter coefficients are predefined. In some embodiments, an L1 regularization penalty may be used to drive unneeded filter coefficients to zero. In some embodiments, a bandwidth penalty may be applied to the objective function to encourage low pass filter designs. In at least some embodiments, the techniques described herein may allow a neural network to identify optimal filter coefficients based on training performed on a large training set across multiple filter parameter combinations. Certain parameters of the neural networks described herein, including configuration information may, in various embodiments and at different times, represent initial, default, or learned parameters of configuration information for neural network In some embodiments, a neural network including the pre-processing and analysis stages described herein may be trained to classify baseband signals derived from radio frequency signals with respect to a plurality of known modulation types. For example, in some embodiments, baseband signals derived from radio frequency signals may be classified by the neural network with respect to the following twenty-four modulation types: BPSK, QPSK, 8PSK, 16PSK, QAM16, QAM64, 2FSK_5KHz, 2FSK_75KHz, GFSK_75KHz, GFSK_5KHz, GMSK, MSK, CPFSK_75KHz, CPFSK_5KHz, APSK16_c34, APSK32_c34, QAM32, OQPSK, PI4QPSK, FM_NB, FM_WB, AM_DSM, AM_SSM, and NOISE. In other embodiments, the neural network may be trained for classifying baseband signals derived from radio frequency signals with respect to more, fewer, or different known modulation types.

In some embodiments, training a neural network for classifying baseband signals derived from radio frequency signals with respect to known modulation types may include adding Gaussian noise, at various levels, to degrade the signal-to-noise ratio associated with signal samples representing baseband signals of known modulation types. In some embodiments, training a neural network for classifying baseband signals derived from radio frequency signals with respect to known modulation types may include corrupting signal samples representing baseband signals of known modulation types, such as by injecting various RF channel effects into the sample data.

In various embodiments, the systems and methods described herein may be used in an application in which the RF spectrum is surveyed to identify transmitted signals and if, based on a baseband IQ vector of what may be relatively noisy signal samples, a modulated signal is detected, the signal is classified with respect to multiple known modulation types.

Figure 2:
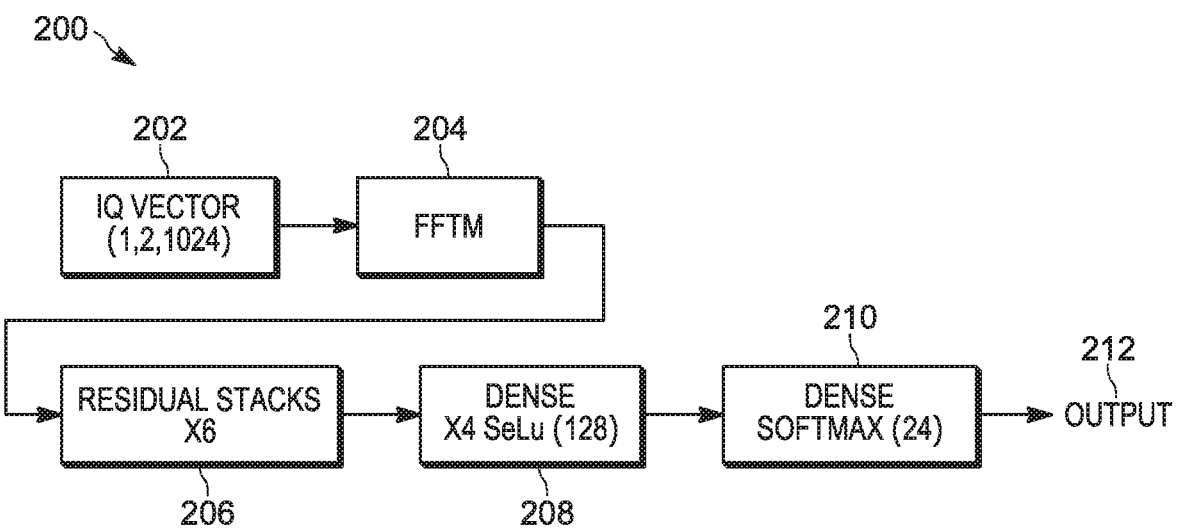
FIG. 2 is a block diagram illustrating selected elements of a neural network including pre-processing and analysis stages, in accordance with some embodiments.

FIG. 2 is a block diagram illustrating selected elements of a neural network 200 including pre-processing and analysis stages, in accordance with some embodiments. In the illustrated embodiment, neural network 200 receives a complex quadrature vector of interest 202 including a plurality of samples of a baseband signal derived from a radio frequency signal of an unknown modulation type. The complex quadrature vector of interest 202 may be a raw or filtered IQ vector representation of the baseband signal including 1024 samples. Each sample includes real (I) and imaginary (Q) parts of the baseband signal of the unknown modulation type in the complex plane. In the illustrated embodiment, output 212 represents a prediction of the modulation type for the baseband signal represented by complex quadrature vector of interest 202. For example, the output 212 of neural network 200 may be a classification result including a final output vector in which each element of the final output vector indicates a probability that the unknown modulation type is a respective one of multiple known modulation types on which the neural network 200 has been trained, or on which the neural network 200 is being trained.

Figure 3:
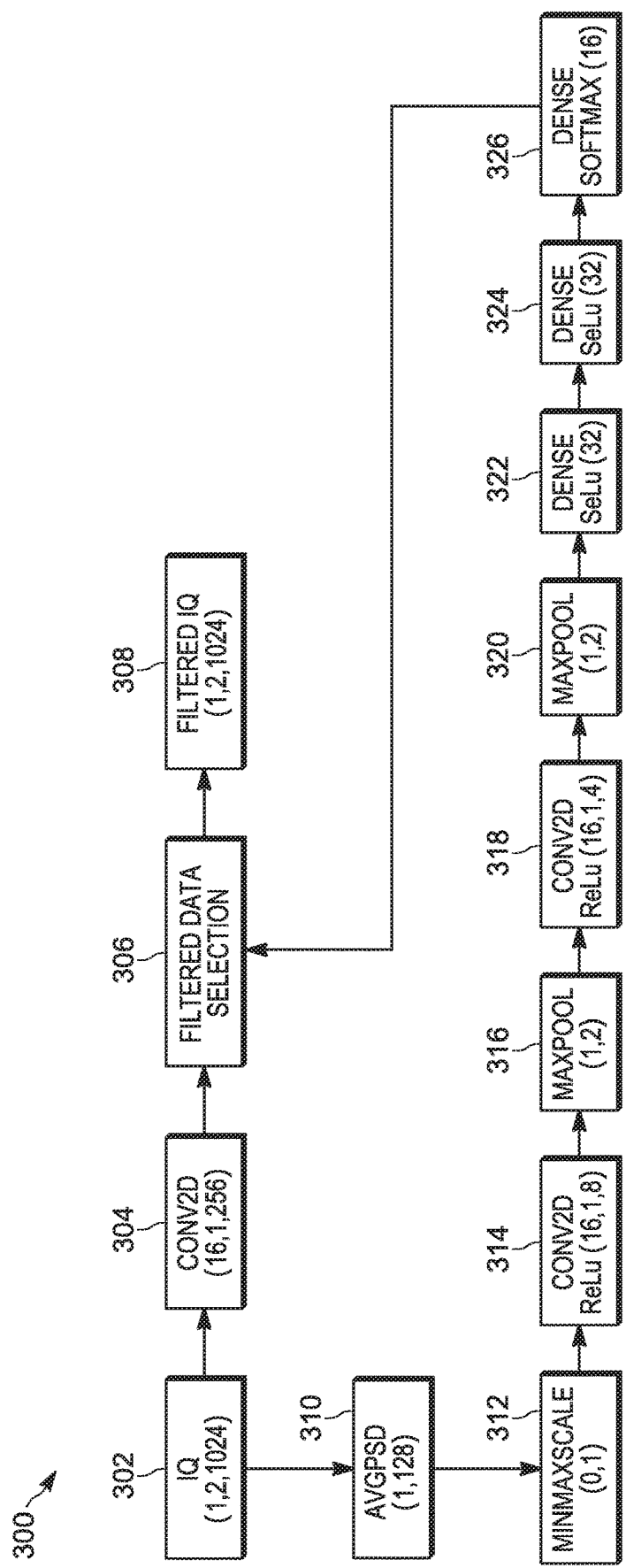
FIG. 3 is a block diagram illustrating selected elements of a pre-processing stage of a neural network including a filter selection sub-network, in accordance with some embodiments.

In the illustrated example, the complex quadrature vector of interest 202 is provided to a pre-processing stage including an FIR filter transform module 204. The FIR filter transform module 204 may include a plurality of FIR filters and a filter selection sub-network for selecting two or more of the plurality of FIR filters and combining their outputs as a linear weighted combination. An example pre-processing stage including elements of an FIR filter transform module is illustrated in FIG. 3.

In various embodiments, a single FIR filter within the plurality of FIR filters may be used or multiple filters cascaded or otherwise combined to produce a filtered version of the complex quadrature vector of interest 202. Traditionally, matched filters are hand-engineered based on the expected waveform of received signals. However, this approach does not generalize well for automatic modulation recognition given the large amount of waveform variation. In at least some embodiments, instead of hand-engineered custom filters for modulation classification, the systems described herein may use end-to-end training to learn the filter coefficients and filter combinations as part of the modulation classification task.

In at least some embodiments, the FIR filters of the FIR filter transform module 204 may be implemented in the neural network via convolution. For example, the FIR filters may be implemented using a convolutional layer that has the bias term disabled and that includes a linear activation function. In this case, the learned convolution kernel weights may correspond to the filter coefficients of the learned FIR filters. In one example, an FIR filter transform module 204 may include 16 FIR filters with 256 coefficients, which creates $\chi_{16,2,1024}$, effectively representing 16 filtered IQ vectors. In this example, the FIR filter transform module 204 may include 23,280 trainable parameters. In one embodiment, a complete module classification model, including FIR filter transform module 204, may include 934,120 trainable parameters.

Figure 4A:
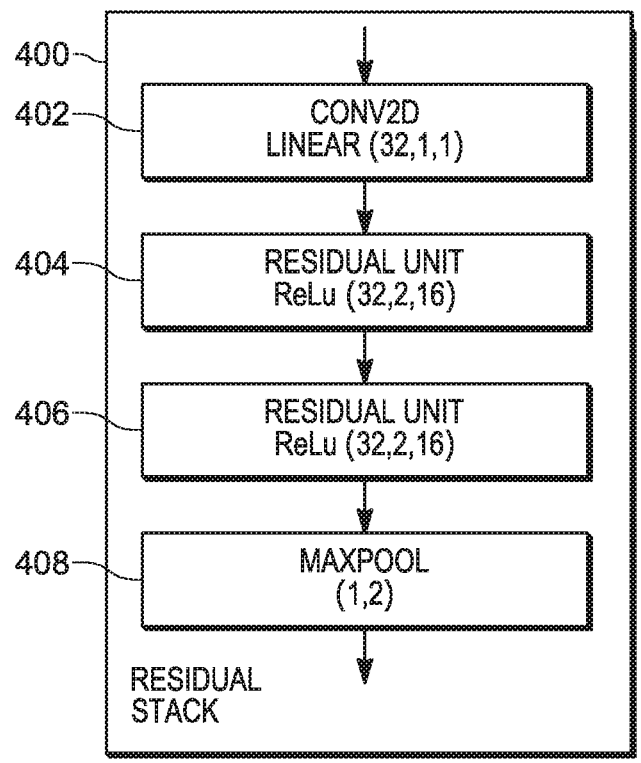
FIG. 4A is a block diagram illustrating selected elements of a residual stack including multiple residual units, in accordance with some embodiments.
Figure 4B:
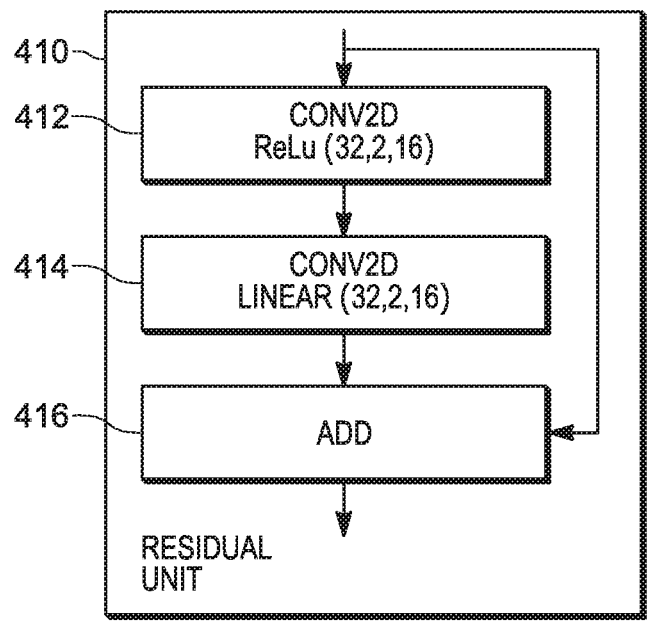
FIG. 4B is a block diagram illustrating selected elements of a residual unit, in accordance with some embodiments.

In the illustrated embodiment, an analysis stage of neural network 200 includes a stack of six 2×16 residual neural network elements shown as residual stacks 206. One example residual neural network element suitable for use in analysis stage of neural network 200 is illustrated in FIGS. 4A and 4B and described below. In the illustrated embodiment, the analysis stage of neural network 200 also includes a fully connected layer, shown as dense layer 208, that uses four scaled exponential linear units (SeLus), to induce self-normalizing. The output of dense layer 208 is provided to a fully connected layer, shown as SoftMax 210, that converts it into a probability distribution. The output of SoftMax 210 is output 212, which represents a prediction of the modulation type for the baseband signal represented by complex quadrature vector of interest 202, as described herein. In some embodiments, certain computations of the FIR filter transform module 204 may leverage GPU resources, if available.

In other embodiments, the analysis stage of the neural network may include any number of residual neural networks, convolutional layers, pooling layers, or fully connected layers, in different combinations.

FIG. 3 is a block diagram illustrating selected elements of a pre-processing stage 300 of a neural network including a filter selection sub-network, in accordance with some embodiments. Elements of each path of the pre-processing stage of the neural network may be replicated to handle both the real (I) and imaginary (Q) parts of the baseband signal. In the illustrated embodiment, pre-processing stage 300 receives a complex quadrature vector input 302 including a plurality of samples of a baseband signal derived from a radio frequency signal of an unknown modulation type. The complex quadrature vector input 302 may be a raw or filtered IQ vector representation of the baseband signal including a plurality of signal samples. Each sample includes real (I) and imaginary (Q) parts of the baseband signal of the unknown modulation type in the complex plane. In the illustrated embodiment, the output of pre-processing stage 300 is a 1×2×1024 filtered IQ vector 308, which is provided to the analysis stage of the neural network for modulation classification.

In the illustrated embodiment, the raw or filtered IQ vector input 302 is provided to two paths of pre-processing stage 300. More specifically, the raw or filtered IQ vector input 302 is provided to a primary path of the pre-processing stage and a filter selection sub-network of the processing stage 300. The filter selection sub-network may act as a feedback mechanism to help select the filter outputs to be combined in the final output, and to generate the weightings for the filter outputs to be combined in the primary path to produce filtered IQ vector 308.

In the illustrated embodiment, the primary path includes a 16×1×256 convolutional layer, shown as Conv2D 304, configured to implement 16 constituent FIR filters with 256 coefficients, as described above in reference to FIG. 2. The outputs of the 16 constituent FIR filters implemented by convolutional layer 304 are provided to filtered data selection element 306 as a 16×2×1024 set of filtered IQ data.

As illustrated in FIG. 3, an averaged Power Spectral Density (PSD) representation 310 of the raw or filtered IQ vector input 302 is generated on one of the paths. Generating the averaged PSD representation 310 may include converting the raw or filtered IQ vector input into a more compressed form. More specifically, the raw or filtered IQ vector input may be fed into a custom layer that computes an averaged, logarithmic scale PSD representation 310 using a 128-point Fast Fourier Transform (FFT) with 120 points of overlap between consecutive FFTs.

In the illustrated embodiment, the 1×128 PSD representation is fed into a MinMaxScale element that scales the data to a [0,1] range so that level shifts between different signal-to-noise levels are ignored. The resulting scaled PSD representation 312 is then provided to the filter selection sub-network for analysis.

In at least some embodiments, the filter selection sub-network may be or include a small deep neural network that includes basic convolutional, pooling, and dense layers. In the illustrated embodiment, the filter selection sub-network includes a 16×1×8 convolutional layer shown as Conv2D 314, a 1×2 pooling layer shown as MaxPool 316, a 16×1×4 convolutional layer shown as Conv2D 318, a second 1×2 pooling layer shown as MaxPool 320, two fully connected layers that use a scaled exponential linear unit (SeLu), shown as dense layers 322 and 324, to induce self-normalizing, and a fully connected layer, shown as SoftMax 326, that converts the output of dense layer 324 into a probability distribution.

In the illustrated embodiment, the output of this sub-network is an N element softmax vector representing a filter selection vector, each element of which represents a respective weighting for one of the N selected FIR filters. This softmax vector may function as an attention mechanism, allowing the model to select the most relevant filters on a per vector basis. The filtered data, $\chi_{16,2,1024}$, and the filter selection vector are then combined in a custom layer, shown as filtered data selection element 306, that computes the filtered IQ vector 308 from a weighted sum of the intermediate filtered vectors output by the selected FIR filters according to equation (2) below.

$$\text{for } n \in [0, 1023], i \in [0, 1] y_i[n] = \sum_{k=1}^{N} w_k \cdot x_{ik}[n] \quad \text{Equation (2)}$$

In Equation (2) above, N represents the number of selected FIR filters whose outputs are to be combined, $x_{ik}$ represents an output of the $k^{th}$ one of the selected FIR filters, and $w_k$ represents the weighting to be applied to the $k^{th}$ one of the FIR filters. As illustrated in FIG. 3, in at least some embodiments, the filtered IQ vector 308 may be restored to the original 1×2×1024 shape of the complex quadrature vector input 302 prior to being passed on to the analysis stage of the neural network for modulation classification. In at least some embodiments, the use of softmax activation, which is differentiable, rather than a filter selector that returns an indication of a maximum value, facilitates end-to-end training, and provides more flexible filtering combinations without creating greater than unity filter gain.

In some embodiments, training the neural network may include applying an attention-based selection mechanism to select the N FIR filters whose outputs are to be combined from among the FIR filters included in an FIR filter bank. In at least some embodiments, the neural network may be trained to select the plurality of FIR filters in the FIR filter bank from among a larger collection of possible FIR filters. Selecting the FIR filters to be included in the FIR filter bank may include determining respective filter coefficients for each of the FIR filters in the FIR filter bank.

In some embodiments, the neural network may be trained to determine respective filter coefficients for each of the FIR filters in the FIR filter bank. in some embodiments, determining the filter coefficients may include applying a Lasso (L1) regularization penalty to bias the respective FIR filter coefficients for each of the FIR filters in the FIR filter bank toward zero. In some embodiments, determining the filter coefficients may include applying an FIR bandwidth penalty to the objective function of the neural network to bias the respective FIR filter coefficients for each of the FIR filters in the FIR filter bank toward coefficients consistent with minimal bandwidth filter designs.

In at least some embodiments, the neural networks described herein may learn that the inclusion of a given one of the FIR filters in the set of selected FIR filters does not significantly improve the modulation classification result. In this case, the learned weighting for the given FIR filter may be extremely low compared to the learned weightings for other FIR filters or may be zero. In some embodiments, FIR filters whose learned weighting is zero or a non-zero number below a predefined threshold may be excluded from contributing to the filtered IQ vector 308 output by the pre-processing stage 300.

FIG. 4A is a block diagram illustrating selected elements of a residual stack 400 including multiple residual units, in accordance with some embodiments. In the illustrated embodiment, residual stack 400 includes a 32×1×1 linear convolutional layer shown as Conv2D 402, two 32×2×16 residual units, shown as residual units 404 and 406, and a 1×2 pooling layer shown as MaxPool 408. Unlike in some existing modulation classification systems that use a (2,3) kernel within the residual units, the systems described herein may use a (2,16) kernel in the residual units. In at least some embodiments, the increased kernel size may significantly increase the number of model parameters and training time but may yield markedly improved performance over systems that use a (2,3) kernel.

FIG. 4B is a block diagram illustrating selected elements of a residual unit 410 in accordance with some embodiments. In various embodiments, one or both of residual unit 404 and residual unit 406 illustrated in FIG. 4A may be similar to residual unit 410. In the illustrated embodiment, residual unit 410 includes a 32×2×16 convolutional layer shown as Conv2D 412, a 32×2×16 linear convolutional layer shown as Conv2D 414, and a summing element 416.

Figure 5:
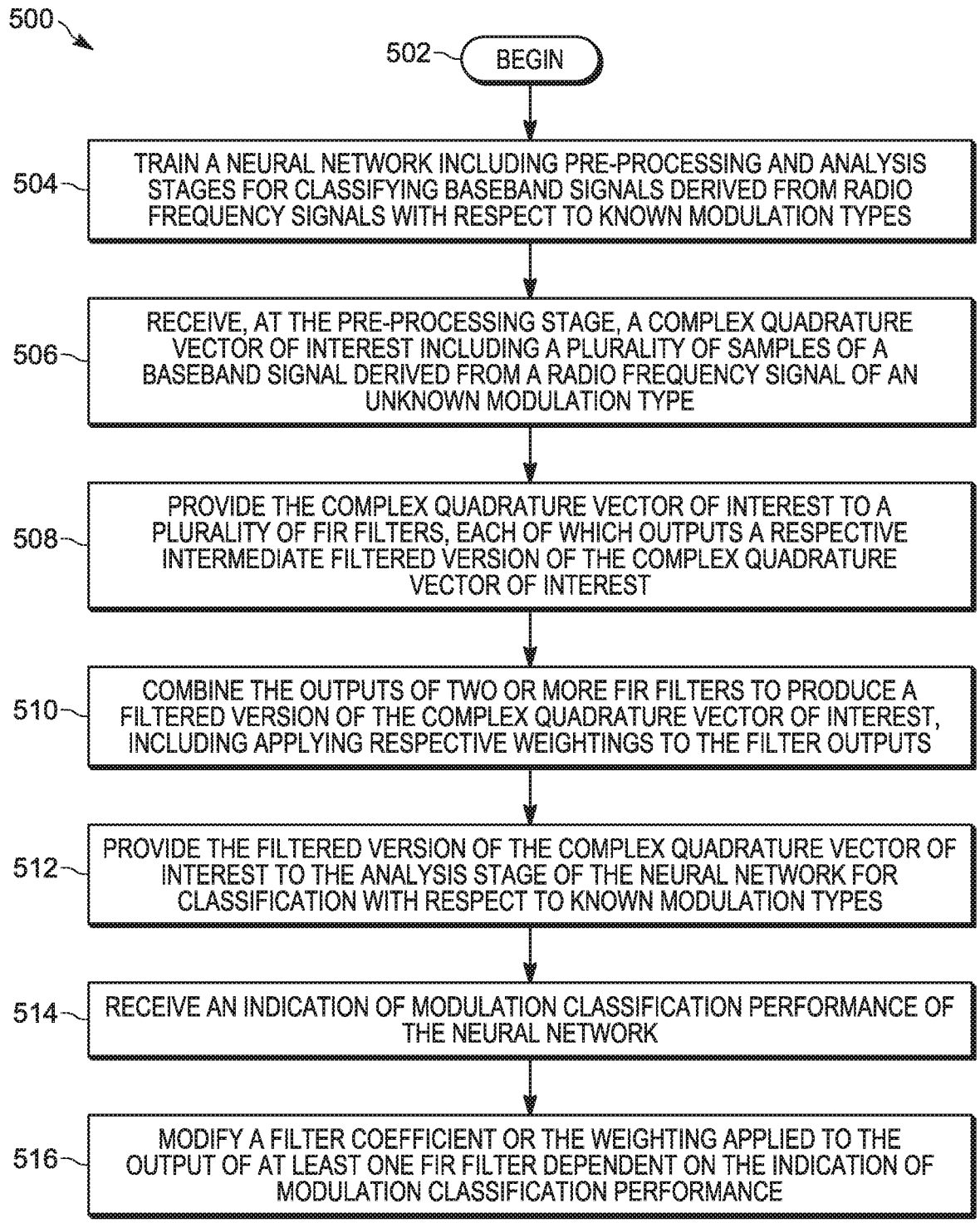
FIG. 5 is a flow diagram of selected elements of an example method for classifying baseband signals derived from radio frequency signals with respect to modulation type, in accordance with some embodiments.

Referring now to FIG. 5, there is provided a flow diagram of selected elements of an example method 500 for classifying baseband signals derived from radio frequency signals with respect to modulation type, in accordance with some embodiments. While a particular order of operations is indicated in FIG. 5 for illustrative purposes, the timing and ordering of such operations may vary where appropriate without negating the purpose and advantages of the examples set forth in detail throughout the remainder of this disclosure. In various embodiments, some or all of the operations of method 500 may be performed by a modulation classification processing unit within a base station, a mobile station, or another device configured to receive and, in some cases, transmit baseband signals, such as modulation classification processing unit 130 illustrated in FIG. 1 or modulation classification processing unit 700 illustrated in FIG. 7.

Figure 6:
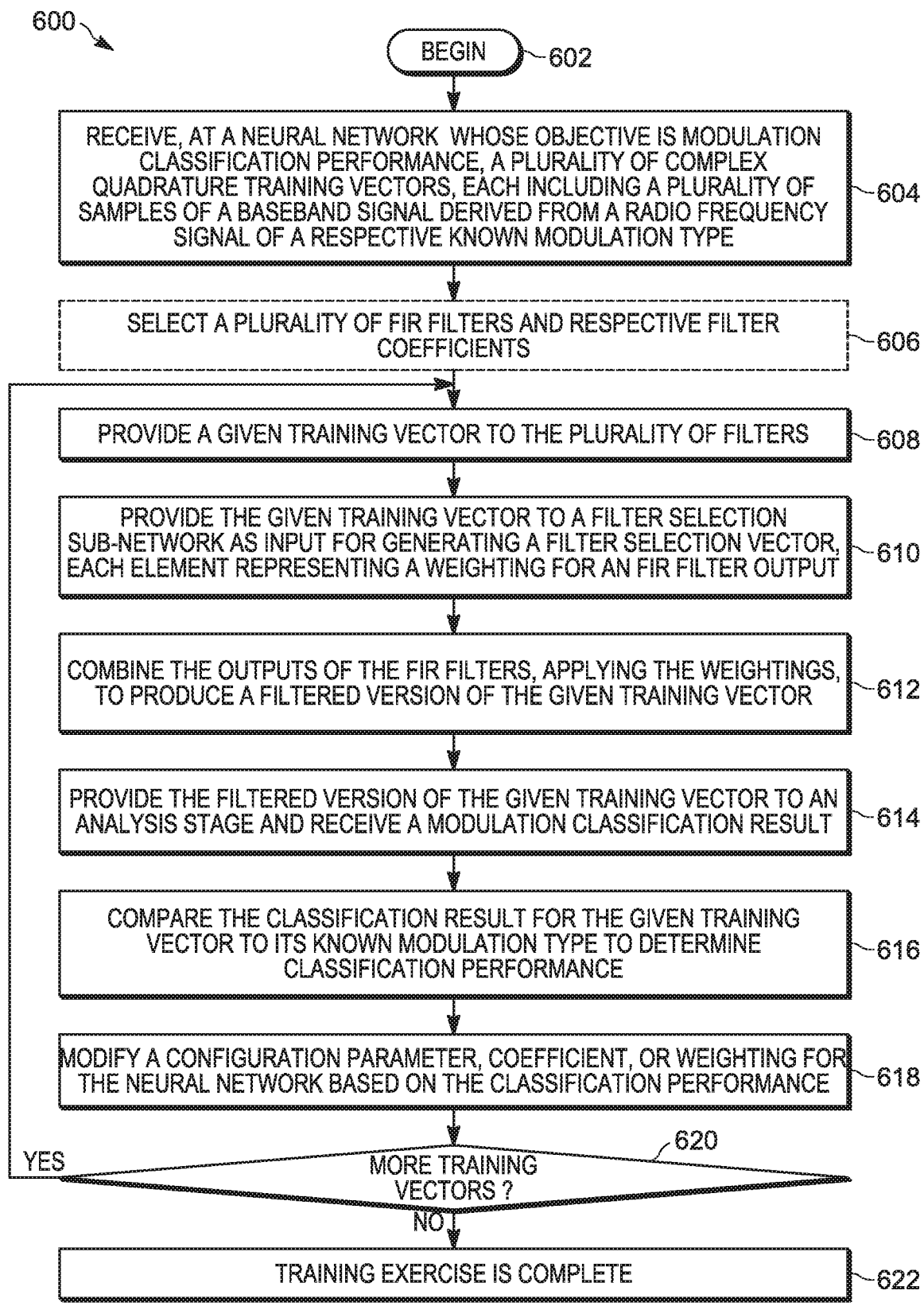
FIG. 6 is a flow diagram of selected elements of an example method for training a neural network including pre-processing and analysis stages for classifying baseband signals derived from radio frequency signals with respect to modulation type, in accordance with some embodiments.

In this example embodiment, method 500 begins with block 502 and continues with block 504, where a neural network including pre-processing and analysis stages is trained for classifying baseband signals derived from radio frequency signals with respect to known modulation types. The objective function for the neural network is modulation classification performance. One example method for training the neural network is illustrated in FIG. 6 and described below.

At 506, method 500 includes receiving, at the pre-processing stage, a complex quadrature vector of interest including a plurality of samples of a baseband signal derived from a radio frequency signal of an unknown modulation type. Each sample includes real (I) and imaginary (Q) parts of the baseband signal of the unknown modulation type in the complex plane. In at least some embodiments, the pre-processing stage may include a filter selection sub-network, as described herein.

At 508, the method includes, at the pre-processing stage, providing the complex quadrature vector of interest to a plurality of FIR filters, each of which outputs a respective intermediate filtered version of the complex quadrature vector of interest. In some embodiments, one or both of the number of filters and the filter coefficients may be pre-defined. In some embodiments, one or both of the number of filters and the filter coefficients may be learned by the neural network during training and may be refined while in use to classify baseband signals.

At 510, method 500 includes, at the pre-processing stage, combining the outputs of two or more of the FIR filters to produce a filtered version of the complex quadrature vector of interest. Combining the FIR filter outputs includes applying respective weightings to the FIR filter outputs. For example, the filtered version of the complex quadrature vector of interest may represent a linear weighted combination of the respective intermediate filtered versions of the vector of interest output by the two or more FIR filters. In some embodiments, the respective weightings may be learned by the neural network and the two or more FIR filters may include some or all of the FIR filters for which the respective weighting is non-zero or exceeds a predetermined minimum threshold.

At 512, the method includes providing the filtered version of the complex quadrature vector of interest to the analysis stage of the neural network for classification with respect to known modulation types. In various embodiments, the analysis stage of the neural network may include one or more of a residual neural network, a convolutional layer, a pooling layer, and a fully connected layer, in different combinations.

At 514, the method includes receiving, an indication of modulation classification performance of the neural network.

At 516, method 500 includes modifying a filter coefficient or the weighting applied to the output of at least one FIR filter dependent on the indication of modulation classification performance.

In at least some embodiments, some or all of the operations of method 500 illustrated in FIG. 5 may be repeated one or more times to classify subsequently received baseband signals derived from radio frequency signals with respect to modulation type in a neural network that includes pre-processing and analysis stages.

Referring now to FIG. 6, there is provided a flow diagram of selected elements of an example method 600 for training a neural network including pre-processing and analysis stages for classifying baseband signals derived from radio frequency signals with respect to modulation type, in accordance with some embodiments. While a particular order of operations is indicated in FIG. 6 for illustrative purposes, the timing and ordering of such operations may vary where appropriate without negating the purpose and advantages of the examples set forth in detail throughout the remainder of this disclosure. In various embodiments, some or all of the operations of method 600 may be performed by a modulation classification processing unit within a base station, a mobile station, or another device configured to receive and, in some cases, transmit baseband signals, such as modulation classification processing unit 130 illustrated in FIG. 1 or modulation classification processing unit 700 illustrated in FIG. 7.

In this example embodiment, method 600 begins with block 602 and continues with block 604, where a plurality of complex quadrature training vectors is received at a neural network that includes pre-processing and analysis stages and whose objective is modulation classification performance. Each of the complex quadrature training vectors may include a plurality of samples of a baseband signal derived from a radio frequency signal of a respective known modulation type on which the neural network is to be trained. For example, in some embodiments, the known modulation types on which the neural network is to be trained may include any of all of the following: BPSK, QPSK, 8PSK, 16PSK, QAM16, QAM64, 2FSK_5KHz, 2FSK_75KHz, GFSK_75KHz, GFSK_5KHz, GMSK, MSK, CPFSK_75KHz, CPFSK_5KHz, APSK16_c34, APSK32_c34, QAM32, OQPSK, PI4QPSK, FM_NB, FM_WB, AM_DSM, and AM_SSM. In some embodiments, in addition to the known modulation types, the neural network may also be trained to classify a baseband signal derived from a radio frequency signal with respect to noise. Each signal sample may include real (I) and imaginary (Q) parts of the baseband signal of the known modulation type in the complex plane. In some embodiments, training the neural network for classifying baseband signals derived from radio frequency signals with respect to modulation type may include adding Gaussian noise, at various levels, to the samples to degrade the signal-to-noise ratio. In some embodiments, the complex quadrature training vectors used in the training may be corrupted by introducing other real-world RF channel effects into some or all of the samples.

At 606, method 600 optionally includes, selecting a predefined plurality of FIR filters and respective filter coefficients. In other embodiments, a plurality of FIR filters and respective filter coefficients may be learned by the neural network during the training.

At 608, the method includes providing a given training vector to the plurality of filters. At 610, method 600 includes providing the given training vector to a filter selection sub-network as input for generating a filter selection vector, each element of which represents a weighting for a respective FIR filter output. In some embodiments, the number of elements in the filter selection vector corresponds to the number of FIR filters in the plurality of filters. In some embodiments, the number of elements in the filter selection vector corresponds to a target or maximum number of FIR filters whose outputs are to be combined to produce a filtered version of the given training vector.

At 612, the method includes combining the outputs of two or more of the FIR filters, including applying their respective weightings, to produce a filtered version of the given training vector. In some embodiments, the number of FIR filters whose outputs are to be combined to produce a filtered version of the given training vector may be learned. In some embodiments, the neural network may be constrained to select, as the two or more FIR filters whose outputs are to be combined, no more than the number of FIR filters for which a corresponding element exists in the filter selection vector.

In some embodiments, the neural network may be trained to select the plurality of FIR filters from among a larger collection of FIR filters, with the selecting including determining respective filter coefficients for each of the plurality of FIR filters. In some embodiments, the training may include applying an attention-based selection mechanism to select the two or more FIR filters whose outputs are to be combined from among the plurality of FIR filters. In some embodiments, the neural network may be trained to determine respective filter coefficients for each of the plurality of FIR filters, the determining including applying a Lasso (L1) regularization penalty to bias the respective FIR filter coefficients for each of the plurality of FIR filters toward zero. In some embodiments, training the neural network to determine respective filter coefficients for each of the plurality of FIR filters may include applying an FIR bandwidth penalty to the objective function of the neural network to bias the respective FIR filter coefficients for each of the plurality of FIR filters toward coefficients consistent with minimal bandwidth filter designs.

In some embodiments, the training may include applying an attention-based selection mechanism to determine the respective weightings represented in the filter selection vector. In some embodiments, the two or more FIR filters whose outputs are combined may include some or all of the FIR filters for which the respective weighting is non-zero or exceeds a predetermined minimum threshold. The techniques described herein for combining multiple FIR filters to generate a filtered version of a complex quadrature vector may, in various embodiments and at different times, result in the selection of a single FIR filter in a bank of FIR filters, a cascade of FIR filters in the bank of FIR filters, or a linear weighted combination of any number of the FIR filters in the FIR filter bank. The neural networks described herein may learn which combinations of FIR filters, along with their respective coefficients and weightings, lead to the best overall modulation classification performance in a particular application context or for a wide variety of application contexts.

At 614, method 600 includes providing the filtered version of the given training vector to an analysis stage of the neural network and receiving a modulation classification result. In various embodiments, the analysis stage of the neural network may include one or more of a residual neural network, a convolutional layer, a pooling layer, and a fully connected layer, in different combinations. The classification result for the baseband signal derived from the radio frequency signal of the unknown modulation type may include a final output vector in which each element of the final output vector indicates a probability that the unknown modulation type is a respective one of the known modulation types.

At 616, the method includes comparing the classification result for the given training vector to the known modulation type of the corresponding baseband signal to determine modulation classification performance for the neural network.

At 618, method 600 includes modifying a configuration parameter, filter coefficient, or filter output weighting for the neural network based on the classification performance. In various embodiments, modifying a configuration parameter may include, for example, modifying a constraint on the number of FIR filters whose outputs are combined to generate the filtered version of the training vectors, or changing the number, type, or configuration of neural network layers or other elements included in the neural network to improve modulation classification performance.

If, at 620, there are additional complex quadrature training vectors to be considered, method 600 may return to 608, after which the operations shown as 608 through 618 may be repeated for each additional complex quadrature training vector. Otherwise, the training exercise may be complete, as shown at 622.

In at least some embodiments, some or all of the operations of method 600 illustrated in FIG. 6 may be repeated one or more times to train, retrain, or improve the modulation classification performance of the neural network as additional complex quadrature training vectors for baseband signals of the same or different known modulation types become available or in response to determining that the modulation classification performance does not yet meet a desired performance target.

In various embodiments, the techniques described herein for classifying baseband signals derived from radio frequency signals with respect to modulation type or for training a neural network including the pre-processing and analysis stages described herein to perform such classifications may be implemented by a modulation classification processing unit of a base station or a mobile station. In other embodiments, these techniques may be implemented by a modulation classification processing unit of another type of device, outside of the context of a base station or mobile station, that is configured to receive and classify baseband signals derived from radio frequency signals or to receive radio frequency signals from which baseband signals can be derived and those baseband signals subsequently classified.

Figure 7:
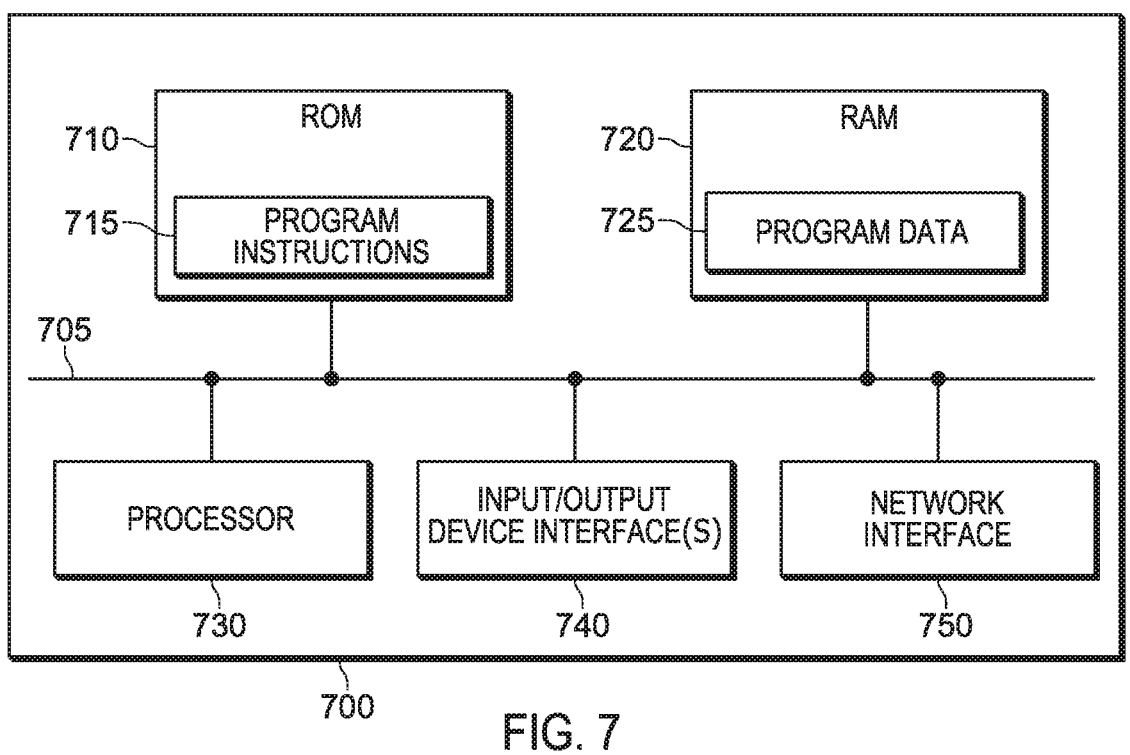
FIG. 7 is a block diagram illustrating selected elements of a modulation classification processing unit configured for classifying baseband signals derived from radio frequency signals with respect to modulation type and for training a neural network including pre-processing and analysis stages to perform such classifications, in accordance with some embodiments.

FIG. 7 is a block diagram illustrating selected elements of a modulation classification processing unit 700 configured for classifying baseband signals derived from radio frequency signals with respect to modulation type and for training a neural network that includes pre-processing and analysis stages to perform such classifications, in accordance with some embodiments. In some embodiments, modulation classification processing unit 700 may be similar to modulation classification processing unit 130 illustrated in FIG. 1. In the illustrated example, modulation classification processing unit 700 includes a Read Only Memory (ROM) 710, a Random Access Memory (RAM) 720, an electronic processor 730, one or more input/output device interfaces 740 for communicating with locally attached devices and components, and a network interface 750 for communicating with a remote server or device (not shown in FIG. 7), all of which are coupled to a system bus 705 through which they communicate with each other. In various embodiments, the electronic processor 730 may include a microprocessor, a graphics processing unit, a microcontroller, a system-on-chip, a field-programmable gate array, a programmable mixed-signal array, or, in general, any system or sub-system that includes nominal memory and that is capable of executing a sequence of instructions in order to control hardware.

In the illustrated embodiment, ROM 710 stores program instructions 715, at least some of which may be executed by the electronic processor 730 to perform the methods described herein. Modulation classification processing unit 700 may thus be configured to implement a neural network including a pre-processing stage and an analysis stage, as described herein, for generating a modulation classification result. In some embodiments, modulation classification processing unit 700 may be configured to implement training a neural network including a pre-processing stage and an analysis stage for generating a modulation classification result. In some embodiments, modulation classification processing unit 700 may also be configured to implement a filtering stage of the neural network. In one example, program instructions 715 may be executed on electronic processor 730 to implement a convolutional layer that effectively implements 16 constituent FIR filters with 256 coefficients, as described herein. In other embodiments, a filtering stage for the neural network may be implemented by filters outside of modulation classification processing unit 700, such as with filters 125 shown in FIG. 1. In various embodiments, any or all of the operations of method 400 illustrated in FIG. 4 or method 500 illustrated in FIG. 5 may be performed by program instructions 715 executing on electronic processor 730 of modulation classification processing unit 700.

For example, program instructions 715 may, when executed by electronic processor 730, be operable to receive, at a pre-processing stage of a neural network whose objective is modulation classification performance, a complex quadrature vector of interest including a plurality of samples of a baseband signal derived from a radio frequency signal of an unknown modulation type, to provide the vector of interest to a plurality of FIR filters, each of which transforms the vector of interest input into an output comprising a respective different intermediate filtered version of the vector of interest, to combine the outputs of two or more of the FIR filters to produce a filtered version of the vector of interest, including applying respective weightings to the outputs of the FIR filters, to provide the filtered version of the vector of interest to an analysis stage of the neural network for classification with respect to a plurality of known modulation types, to receive an indication of modulation classification performance of the neural network, and to modify a filter coefficient or the respective weighting applied to the output of at least one FIR filter in the plurality of FIR filters dependent on the indication of modulation classification performance.

In another example, program instructions 715 may, when executed by electronic processor 730, be operable to receive a plurality of complex quadrature training vectors, each training vector including a plurality of samples of a baseband signal derived from a radio frequency signal of a respective one of the plurality of known modulation types and, for each of the plurality of training vectors, to provide the training vector to a plurality of FIR filters, to provide the training vector to a filter selection sub-network of the neural network, the output of which includes a filter selection vector in which each element represents a weighting to be applied to the output of a respective one of the FIR filters, to combine the outputs of the FIR filters to produce a filtered version of the training vector, including applying the respective weightings to the outputs of the FIR filters, to provide the filtered version of the training vector to the analysis stage of the neural network, to receive, as an output of the neural network, a classification result for the training vector with respect to the plurality of known modulation types, and to compare the classification result with the known modulation type of the baseband signals derived from the radio frequency signal for which a plurality of samples is included in the complex quadrature training vector.

In some embodiments, program instructions 715 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 715 may include program instructions that when executed by electronic processor 730 implement other functionality features of a base station, mobile station, or other device configured to receive and, in some cases, transmit baseband signals derived from radio frequency signals or radio frequency signals from which baseband signals are derived, in addition to program instructions that, when executed, cause the electronic processor 730 to classify baseband signals with respect to modulation type or to train a neural network to perform such classifications. For example, in some embodiments, program instructions 715 may, when executed by electronic processor 730, be operable to perform encoding signals to be transmitted or decoding received signals.

In this example embodiment, RAM 720 may, from time to time, store program data 725 including, without limitation, configuration information for a neural network that includes the pre-processing and analysis stages described herein. In various embodiments, the configuration information may include information indicating a number of FIR filters for which the outputs are to be combined to produce a filtered version of a complex quadrature vector in a classification or neural network training exercise, a combination of filter coefficients for the FIR filters to be used in a classification or neural network training exercise, respective weightings to be applied to outputs of the FIR filters to be used in a classification or neural network training exercise, the number, type, or configuration of neural network layers or other elements included the neural network, or other data accessible by program instruction 715 and used in performing the methods described herein. Certain elements of this program data may, in various embodiments and at different times, represent initial, default, or learned configuration information for the neural network.

In some embodiments, RAM 720 may also store data used in performing other functions of the modulation classification processing unit 700. In some embodiments, RAM 720 may, from time to time, store local copies of all or a portion of program instructions 715 or other program instructions copied from ROM 710 or received over network interface 750.

In this example embodiment, input/output device interfaces 740 may include one or more analog input interfaces, such as one or more analog-to-digital (A/D) convertors, or digital interfaces for receiving signals or data from, and sending signals or data to, one or more input/output devices. In some embodiments, may include one or more analog input interfaces for receiving baseband or radio frequency signals. In some embodiments, input/output device interfaces 740 may include one or more external memory interfaces through which modulation classification processing unit 700 may be coupled to an external memory (not shown in FIG. 7). Such an external memory may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few. In various embodiments, or at certain times, some or all of program data 725 may reside in external memory rather than, or in addition to, within RAM 720.

In various embodiments, input/output device interfaces 740 may operate to receive user input, to provide system output, or a combination of both. User input may be provided via, for example, a keyboard or keypad, a microphone, soft keys, icons, or soft buttons on a touch screen of a display, such as display 145 illustrated in FIG. 1, a scroll ball, a mouse, buttons, and the like. Input/output device interfaces 740 may also include other input mechanisms, which for brevity are not described herein and which may be implemented in hardware, software, or a combination of both. In some embodiments, input/output device interfaces 740 may include a graphical user interface (GUI) generated, for example, by electronic processor 730 from program instructions 715 and program data 725 and presented on display 145, enabling a user to interact with display 145.

Network interface 750 may be a suitable system, apparatus, or device operable to serve as an interface between electronic processor 730 and a network. Network interface 750 may enable modulation classification processing unit 700 to communicate over a network using a suitable transmission protocol or standard, including, but not limited to, transmission protocols and standards enumerated below with respect to the discussion of the network. In some embodiments, network interface 750 may be communicatively coupled via a network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages, which are generally referred to as data. The network may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network and its various components may be implemented using hardware, software, or any combination thereof.

Network interface 750 may enable wired or wireless communications to and from modulation classification processing unit 700 and other elements of a base station, mobile station, or other device configured to receive and classify baseband signals derived from radio frequency signals or to receive radio frequency signals from which baseband signals can be derived and those baseband signals subsequently classified. In some embodiments, baseband or radio frequency signals may also or alternatively be received over network interface 750 rather than one of input/output device interfaces 740.

The systems and methods described herein for classifying baseband signals derived from radio frequency signals with respect to modulation type may employ end-to-end training of learned filters using classification performance as an objective function. In some embodiments, an L1 regularization penalty may be used to drive unneeded filter coefficients to zero. In some embodiments, a bandwidth penalty may be applied to the objective function to encourage low pass filter designs. In some embodiments, these systems and methods may use attention-selection of learned filters to determine the contributions, and corresponding output weightings, of each learned FIR filter.

In experiments to evaluate the techniques described herein, three models were evaluated to demonstrate the performance improvement of the technique. In a baseline model, the FIR filter transform module was removed entirely. In a predefined model, the FIR filter transform module was used, but the FIR filter weightings were fixed based on a set of predefined FIR filter coefficients. For example, the filter coefficients of the predefined model were chosen to provide various bandpass bandwidths, flat passbands, and high noise rejection outside the passband. In a learned model, the FIR filter coefficients were learned as part of the end-to-end modulation classification model training. More specifically, the use of the FIR filter transform modules described herein for pre-processing complex quadrature vector data prior to providing the complex quadrature vector data to an analysis stage of a neural network was shown to result in a 14% reduction in relative error rate in modulation classification compared to a traditional deep learning model with such pre-processing.

The FIR filter frequency responses from the best learned model exhibited much wider variety in filter behavior than did the basic bandpass filters provided in the predefined case. The predefined filters were broadly selected, with concentrations on two of the narrower filters. However, the learned filters were heavily weighted to a subset of the available filters that corresponded to the most mature, well-defined frequency responses. While perhaps not as 'sharp' as hand-generated expert filters they nonetheless exhibited many traditional filter characteristics and appeared to be settling on various common matched filter variations. These results indicate that the number of learned FIR filters may be reduced with minimal performance impact.

While the experiments described above were used to compare modulation classification performance between predefined and learned filter scenarios, in some embodiments of the neural networks described herein, these two approaches may be applied in parallel. For example, in one hybrid approach, two FIR filter banks, one predefined and one learned, may be used with the same attention mechanism. In another hybrid approach, a learned model may begin with a rough set of expertly crafted filter coefficients, such as those used in the predefined model described above, and end-to-end training may be applied to evolve the filter design from this starting point, rather than from a uniform filter starting point or from scratch.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors, or "processing devices", such as microprocessors, digital signal processors, GPUs, customized processors and field programmable gate arrays (FPGAs) and unique stored program instructions, including both software and firmware, that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer including for example, a processor, to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for classifying baseband signals derived from radio frequency signals with respect to modulation type, comprising:

receiving, at a pre-processing stage of a neural network whose objective is modulation classification performance, a complex quadrature vector of interest including a plurality of samples of a baseband signal derived from a radio frequency signal of an unknown modulation type, each sample including real and imaginary parts of the baseband signal of the unknown modulation type in the complex plane;

providing the complex quadrature vector of interest to a first plurality of finite impulse response (FIR) filters, each of which transforms the complex quadrature vector of interest input into an output comprising a respective different intermediate filtered version of the complex quadrature vector of interest;

combining the outputs of two or more of the first plurality of FIR filters to produce a filtered version of the complex quadrature vector of interest, the combining including applying respective weightings to the outputs of the two or more FIR filters;

providing the filtered version of the complex quadrature vector of interest to an analysis stage of the neural network for classification with respect to a plurality of known modulation types;
receiving an indication of modulation classification performance of the neural network; and
modifying a filter coefficient or the respective weighting applied to the output of at least one FIR filter in the first plurality of FIR filters dependent on the indication of modulation classification performance.

2. The method of claim 1, further comprising, prior to receiving the complex quadrature vector of interest, training the neural network to classify baseband signals derived from radio frequency signals with respect to the plurality of known modulation types.

3. The method of claim 2, further comprising training the neural network to select the first plurality of FIR filters from among a second plurality of FIR filters, the second plurality of FIR filters including the first plurality of FIR filters and one or more additional FIR filters, and the selecting including determining respective filter coefficients for each of the first plurality of FIR filters.

4. The method of claim 2, wherein training the neural network further comprises applying an attention-based selection mechanism to select the two or more FIR filters from among the first plurality of FIR filters.

5. The method of claim 2, further comprising training the neural network to determine respective filter coefficients for each of the first plurality of FIR filters, the determining including applying a Lasso (L1) regularization penalty to bias the respective FIR filter coefficients for each of the first plurality of FIR filters toward zero.

6. The method of claim 2, further comprising training the neural network to determine respective filter coefficients for each of the first plurality of FIR filters, the determining including applying an FIR bandwidth penalty to the objective function of the neural network to bias the respective FIR filter coefficients for each of the first plurality of FIR filters toward coefficients consistent with minimal bandwidth filter designs.

7. The method of claim 1, further comprising, prior to receiving the complex quadrature vector of interest, training the neural network to classify baseband signals derived from radio frequency signals with respect to the plurality of known modulation types, the training including:
receiving a plurality of complex quadrature training vectors, each training vector including a plurality of samples of a baseband signal derived from a radio frequency signal of a respective one of the plurality of known modulation types;
for each of the plurality of complex quadrature training vectors:
providing the complex quadrature training vector to the first plurality of FIR filters;
providing the complex quadrature training vector to a filter selection sub-network of the neural network, the output of which includes a filter selection vector in which each element represents a weighting to be applied to the output of a respective one of the first plurality of FIR filters;
combining the outputs of the first plurality of FIR filters to produce a filtered version of the complex quadrature training vector, the combining including applying the respective weightings to the outputs of the first plurality of FIR filters;
providing the filtered version of the complex quadrature training vector to the analysis stage of the neural network;
receiving, as an output of the neural network, a classification result for the complex quadrature training vector with respect to the plurality of known modulation types; and
comparing the classification result with the known modulation type of the baseband signals derived from the radio frequency signal for which a plurality of samples is included in the complex quadrature training vector.

8. The method of claim 7, wherein training the neural network further comprises applying an attention-based selection mechanism to determine the respective weightings represented in the filter selection vector.

9. The method of claim 7, wherein:
for a given one of the first plurality of FIR filters, the respective weighting is zero; and
the two or more FIR filters do not include the given FIR filter.

10. The method of claim 1, wherein respective filter coefficients for each of the first plurality of FIR filters are predefined.

11. The method of claim 1, wherein the number of FIR filters in the first plurality of FIR filters is predefined.

12. A system for classifying baseband signals derived from radio frequency signals with respect to modulation type, comprising:
an analysis stage of a neural network whose objective is modulation classification performance;
a first plurality of finite impulse response (FIR) filters; and
a pre-processing stage of the neural network configured to:
receive a complex quadrature vector of interest including a plurality of samples of a baseband signal derived from a radio frequency signal of an unknown modulation type, each sample including real and imaginary parts of the baseband signal of the unknown modulation type in the complex plane;
provide the complex quadrature vector of interest to the first plurality of FIR filters, each of which transforms the complex quadrature vector of interest input into an output comprising a respective different intermediate filtered version of the complex quadrature vector of interest;
combine the outputs of two or more of the first plurality of FIR filters to produce a filtered version of the complex quadrature vector of interest, the combining including applying respective weightings to the outputs of the two or more FIR filters;
provide the filtered version of the complex quadrature vector of interest to the analysis stage of the neural network for classification with respect to a plurality of known modulation types;
receive an indication of modulation classification performance of the neural network; and
modify a filter coefficient or the respective weighting applied to the output of at least one FIR filter in the first plurality of FIR filters dependent on the indication of modulation classification performance.

13. The system of claim 12, further comprising a filter selection sub-network of the neural network configured to output a filter selection vector in which each element represents a weighting to be applied to the output of a respective one of the first plurality of FIR filters;

wherein, prior to receiving the complex quadrature vector of interest, the pre-processing stage of the neural network is configured to:
  receive a plurality of complex quadrature training vectors, each training vector including a plurality of samples of a baseband signal derived from a radio frequency signal of a respective one of the plurality of known modulation types; and
  for each of the plurality of complex quadrature training vectors:
    provide the complex quadrature training vector to the first plurality of FIR filters;
    provide the complex quadrature training vector to the filter selection sub-network as an input to generation of the filter selection vector;
    combine the outputs of the first plurality of FIR filters to produce a filtered version of the complex quadrature training vector, the combining including applying the respective weightings in the filter selection vector to the outputs of the first plurality of FIR filters; and
    provide the filtered version of the complex quadrature training vector to the analysis stage of the neural network; and
  wherein, for each of the plurality of complex quadrature training vectors, the analysis stage of the neural network is configured to:
    generate a classification result for the complex quadrature training vector with respect to the plurality of known modulation types; and
    compare the classification result with the known modulation type of the baseband signals derived from the radio frequency signal for which a plurality of samples is included in the complex quadrature training vector.

14. The system of claim 13, further comprising a second plurality of FIR filters including the first plurality of FIR filters and one or more additional FIR filters, wherein the filter selection sub-network of the neural network is further configured to select the first plurality of FIR filters from among the second plurality of FIR filters, the selecting including determining respective filter coefficients for each of the first plurality of FIR filters.

15. The system of claim 13, wherein the filter selection sub-network of the neural network is further configured to determine respective filter coefficients for each of the first plurality of FIR filters, the determining including applying a Lasso (L1) regularization penalty to bias the respective FIR filter coefficients for each of the first plurality of FIR filters toward zero.

16. The system of claim 13, wherein the filter selection sub-network of the neural network is further configured to determine respective filter coefficients for each of the first plurality of FIR filters, the determining including applying an FIR bandwidth penalty to the objective function of the neural network to bias the respective FIR filter coefficients for each of the first plurality of FIR filters toward coefficients consistent with minimal bandwidth filter designs.

17. The system of claim 13, wherein the filter selection sub-network of the neural network is further configured to apply an attention-based selection mechanism to select the two or more FIR filters from among the first plurality of FIR filters.

18. The system of claim 13, wherein the filter selection sub-network of the neural network is further configured to apply an attention-based selection mechanism to determine the respective weightings represented in the filter selection vector.

19. The system of claim 13, wherein:
  for a given one of the first plurality of FIR filters, the respective weighting is zero; and
  the two or more FIR filters do not include the given FIR filter.

20. The system of claim 13, wherein at least one of respective filter coefficients for each of the first plurality of FIR filters and the number of FIR filters in the first plurality of FIR filters is predefined.

* * * * *